United States Patent [19]
Yoshii et al.

[11] Patent Number: 6,097,546
[45] Date of Patent: Aug. 1, 2000

[54] PROJECTION OPTICAL UNIT AND PROJECTION DISPLAY

[75] Inventors: Syouichi Yoshii, Fujiidera; Syunichi Kishimoto, Kaizuka; Yukinori Kuwano, Katano, all of Japan

[73] Assignee: Sanyo Electric Co., Ltd., Osaka, Japan

[21] Appl. No.: 09/104,206

[22] Filed: Jun. 25, 1998

[30] Foreign Application Priority Data

Jun. 27, 1997 [JP] Japan ................................. 9-172660
Sep. 29, 1997 [JP] Japan ................................. 9-263723

[51] Int. Cl.$^7$ .................................................. G02B 3/00
[52] U.S. Cl. ................... 359/649; 349/7; 349/8; 359/650; 359/651
[58] Field of Search ................... 349/8, 10, 5, 7; 359/649, 650, 651

[56] References Cited

U.S. PATENT DOCUMENTS 5,191,450  3/1993  Yajima et al. ............................. 359/54
5,360,282  11/1994  Nagengast et al. ...................... 403/131
5,805,244  9/1998  Suh ............................................. 349/7
5,833,360  11/1998  Knox et al. ............................... 362/293

*Primary Examiner*—Georgia Epps
*Assistant Examiner*—Tim Thompson
*Attorney, Agent, or Firm*—Arent Fox Kintner Plotkin & Kahn

[57] ABSTRACT

A projection optical unit comprises a frame, a projection lens, a dichroic prism for synthesizing red image light, green image light and blue image light, and three liquid crystal display panels for red, green and blue. A lens mounting portion on which the projection lens is mounted, a prism mounting portion on which the dichroic prism is mounted, and three mounting surfaces on which the three liquid crystal display panels are respectively mounted are formed in the frame. The projection lens, the dichroic prism, and the three liquid crystal display panels are mounted on the frame. The three liquid crystal display panels are mounted through a focus adjusting mechanism comprising a belleville spring and a screw. The two liquid crystal display panels for red and blue are further subjected to CG adjustment (adjustment for matching pixels of the liquid crystal display panels for read and blue with pixels of the liquid crystal display panel for green) by an eccentric screw.

31 Claims, 12 Drawing Sheets

PROJECTION OPTICAL UNIT AND PROJECTION DISPLAY

BACKGROUND OF THE INVENTION

Field of the Invention

FIG. 12 is a plan view showing a projector 560 of a three-panel (R, G, B) type in a projection display. Light emitted from a lamp 562a is reflected on a converging reflector 561, is emitted from a light source 562 after ultraviolet rays and infrared rays are removed therefrom through an UV/IR filter 563, and is incident on a dichroic mirror 551. The dichroic mirror 551 transmits red light (R) and reflects green light (G) and blue light (B). The red light obtained by the separation in the dichroic mirror 551 is sent to a liquid crystal display panel for red 553 on which a red image is to be displayed upon being reflected on a total reflection mirror 552. The red light passes through the liquid crystal display panel 553 after the amount of its transmission is changed in the liquid crystal display panel 553, and is then sent to a dichroic prism 554 serving as photosynthesis means.

On the other hand, the green light (G) and the blue light (B) which are reflected on the dichroic mirror 551 are sent to a dichroic mirror 555. The dichroic mirror 555 reflects the green color (G) and transmits the blue light (B). The green light obtained by the separation in the dichroic mirror 555 is sent to a liquid crystal display panel for green 556 on which a green image is to be displayed. The green light passes through the liquid crystal display panel 556 after the amount of its transmission is changed in the liquid crystal display panel 556, and is then sent to the dichroic prism 554.

The blue light passing through the dichroic mirror 555 is sent to a liquid crystal display panel for blue 559 on which a blue image is to be displayed upon being reflected on total reflection mirrors 557 and 558. The blue light passes through the liquid crystal display panel 559 after the amount of its transmission is changed in the liquid crystal display panel 559, and is then sent to the dichroic prism 554.

The red image light, the green image light and the blue image light which are incident on the dichroic prism 554 are synthesized, and light obtained by the synthesis is emitted as color image light (R, G, B). The emitted color image light is projected on a screen (not shown) through a projection lens 564.

In the projector 560 of such construction, the arrangement precision of optical members (the degree of coincidence of optical axes) is important in improving the image quality. Each of the optical members is mounted on a case 560a of the projector 560. However, an attempt to heighten the processing precision of a member mounting portion in the case 560a in order to increase the above-mentioned precision increases the fabrication cost of the projector 560, which is not realistic.

Means for focus adjustment are respectively provided for the liquid crystal display panels 553, 556, and 559, and means for CG adjustment (adjustment for matching pixels of the liquid crystal display panels 553 and 559 with pixels of the liquid crystal display panel for green 556) are further respectively provided for the liquid crystal display panels 553 and 559. Such adjustment means is constituted by means for fixing a plate member (not shown) for supporting each of the liquid crystal display panels to the member mounting portion at a base of the case 560a of the projector 560 and slightly inclining the plate member, so that the liquid crystal display panel can be inclined and shifted along its optical axis (focus adjustment), and can be moved in its surface (CG adjustment).

Since the dimensional precision of the member mounting portion in the case 560a is not too high, as described above, it takes long to make adjustment (particularly, focus adjustment), and fine adjustment is not easy. Further, the focus adjustment and the CG adjustment in the liquid crystal display panel cannot be made until the projector 560 is completed.

FIG. 13 is a diagram showing the schematic construction of an example of a conventional rear projection display. The rear projection display comprises a projector 602, a projection lens 603, a reflecting mirror 604, a reflecting mirror 605, a case 601 containing the optical members, and a transmission type diffusing screen 606. Image light from the projector 602 is reflected on the reflecting mirrors 604 and 605 after through the projection lens 603. The image light reflected on the reflecting mirror 605 is incident on the rear surface of the screen 606, and is diffused and emitted from the front surface of the screen 606, so that a viewer can view an image in a position on the front surface of the screen 606.

In order to make a screen of the conventional rear projection display large, the projection lens 603 having a high projection magnifying power must be used, or the distance of an optical path from the projector 602 to the screen 606 must be increased. In the present condition, however, there is a limit on the projection magnifying power of the projection lens 603. When the projection lens 603 having a high projection magnifying power is used, the depth of the case 601 is rather increased depending on the structure and the arrangement of the reflecting mirror, so that it is difficult to make the case 601 thin. When the distance of the optical path from the projector 602 to the screen 606 is increased, the depth of the case 601 is similarly increased, so that it is difficult to make the case 601 thin.

SUMMARY OF THE INVENTION

The present invention has been made to solve the above-mentioned problems and has for its object to provide a projection optical unit which makes focus adjustment or the like unnecessary or easy by making assembly with high precision possible and capable of making focus adjustment or the like of a liquid crystal display panel in a stage before completion of a projector. Further, an object of the present invention is to provide a projection display capable of adjusting an optical axis by simple mounting work and further making it possible to thin and miniaturize a case.

In view of the above-mentioned circumstances, a projection optical unit according to the present invention is characterized by comprising a frame having a lens mounting portion on which a projection lens is mounted, and a mounting surface on which a liquid crystal display panel is mounted, formed therein, the projection lens and the liquid crystal display panel being provided in the frame.

In the above-mentioned construction, the frame is smaller than a case of a projector, so that it is hardly distorted, for example, by its own weight, and is easily formed, for example. Therefore, sufficient precision is easily given to the mounting portion and the mounting surface. Since high precision has been already given in the frame, the necessity of focus adjustment or the like in the liquid crystal display panel may be eliminated only by mounting the liquid crystal display panel on the frame. Even when the liquid crystal display panel is mounted on the mounting surface through an adjuster screw(as described in claim 2 and 3), considering that it is not necessarily easy to ensure such precision as to eliminate the necessity of the adjustment even if the precision of the mounting portion in the frame can be increased, precision has been already high, so that the adjustment can be made in a short time period, and the fine adjustment is easy.

Furthermore, it has been conventionally necessary to make various kinds of adjustment upon incorporating the projection lens and the liquid crystal display panel into the case of the projector. In the above-mentioned construction, however, the adjustment can be made in a stage of the projection optical unit, so that the projection optical unit can be incorporated into the projector after completion of the adjustment, and the assembly work of the projector is also made efficient.

A projection optical unit according to the present invention is characterized by comprising a frame having a lens mounting portion on which a projection lens is mounted, a photosynthesis means mounting portion on which photosynthesis means for synthesizing red image light, green image light and blue image light is mounted, and three mounting surfaces on which three liquid crystal display panels for red, green and blue are respectively mounted, formed therein, the projection lens, the photosynthesis means, and the three liquid crystal display panels being provided in the frame. By such construction, the above-mentioned function is realized in a so-called three panel type.

A projection optical unit according to the present invention is characterized by comprising a frame having a lens mounting portion on which a projection lens is mounted, a mounting surface on which a liquid crystal display panel is mounted, and a reflecting optical member mounting portion on which a reflecting optical member for introducing the image light from the liquid crystal display panel into the projection lens upon changing an optical path of the image light is mounted, formed therein, the projection lens, the reflecting optical member, and the liquid crystal display panel being provided in the frame. In such construction, the projector can be placed flat while producing the above-mentioned function, thereby making it possible to decrease the height of the projection display.

A projection optical unit according to the present invention is characterized by comprising a frame having a lens mounting portion on which a projection lens is mounted, a photosynthesis means mounting portion on which photosynthesis means for synthesizing red image light, green image light and blue image light is mounted, three mounting surfaces on which three liquid crystal display panels for red, green and blue are respectively mounted, and a reflecting optical member mounting portion on which a reflecting optical member for introducing the image light from the photosynthesis means into the projection lens upon changing an optical path of the image light is mounted, formed therein, the projection lens, the reflecting optical member, the photosynthesis means, and the three liquid crystal display panels being provided in the frame. By such construction, the above-mentioned function is realized in a projection display of a so-called three panel type.

The liquid crystal display panel may be mounted on the mounting surface of the frame through an adjuster screw. Although examples of the mounting adjustment of the liquid crystal display panel include CG adjustment and focus adjustment, the focus adjustment is important. In such construction that the focus adjustment or the like is made by the adjuster screw, the supporting structure of the liquid crystal display panel can be simplified, as compared with a mechanism for slightly inclining a plate-shaped member for supporting the liquid crystal display panel.

A projection display according to the present invention is a projection display for enlarging image light from a projector using a projection lens and projecting and displaying the image light on a screen, characterized by comprising a reflecting optical member for introducing the image light from the projector into the projection lens upon changing an optical path of the image light, and a connecting member for connecting and integrating the reflecting optical member and the projection lens.

In the above-mentioned construction, the positional relationship between the projection lens and the reflecting optical member can be properly set by simple mounting work with the connecting member, so that the image light from the projector can be satisfactorily introduced into the projection lens. Further, the projector can be placed flat, thereby making it possible to decrease the height of the projection display.

It is desirable that the reflecting optical member is a prism. A reflecting mirror or the like may be used as the reflecting optical member. However, the use of the prism makes it possible to make the distance of its optical path longer, as compared with the use of the reflecting mirror or the like.

It is desirable that the projector is arranged such that an optical axis of image light traveling toward the reflecting optical member is parallel or approximately parallel to the length of the screen, and the reflecting optical member and the projection lens are disposed so as to introduce the image light in a direction perpendicular or approximately perpendicular to the optical axis of the image light traveling toward the reflecting optical member and in a direction parallel or approximately parallel to the screen. Consequently, the height and the depth of the case can be decreased by effectively utilizing a transverse space of the case which is almost determined by the width of the screen.

A projection display according to the present invention is a projection display for synthesizing a plurality of types of image light which differ in wavelengths from a projector by photosynthesis means, enlarging image light obtained by the synthesis by a projection lens, and projecting and displaying the image light on a screen, characterized by comprising a reflecting optical member for introducing the image light from the projector into the projection lens upon changing an optical path of the image light, and a connecting member for connecting and integrating the reflecting optical member, the projection lens and the photosynthesis means. It is desirable that the projector is arranged such that an optical axis of image light traveling toward the reflecting optical member is parallel or approximately parallel to the length of the screen, and the reflecting optical member and the projection lens are disposed so as to introduce the image light in a direction perpendicular or approximately perpendicular to the optical axis of the image light traveling toward the reflecting optical member and a direction parallel or approximately parallel to the screen. By such construction, the above-mentioned function is realized in a projection display of a so-called three panel type.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (Embodiment 1)

An embodiment of the present invention will be described on the basis of the drawings.

Figure 1:
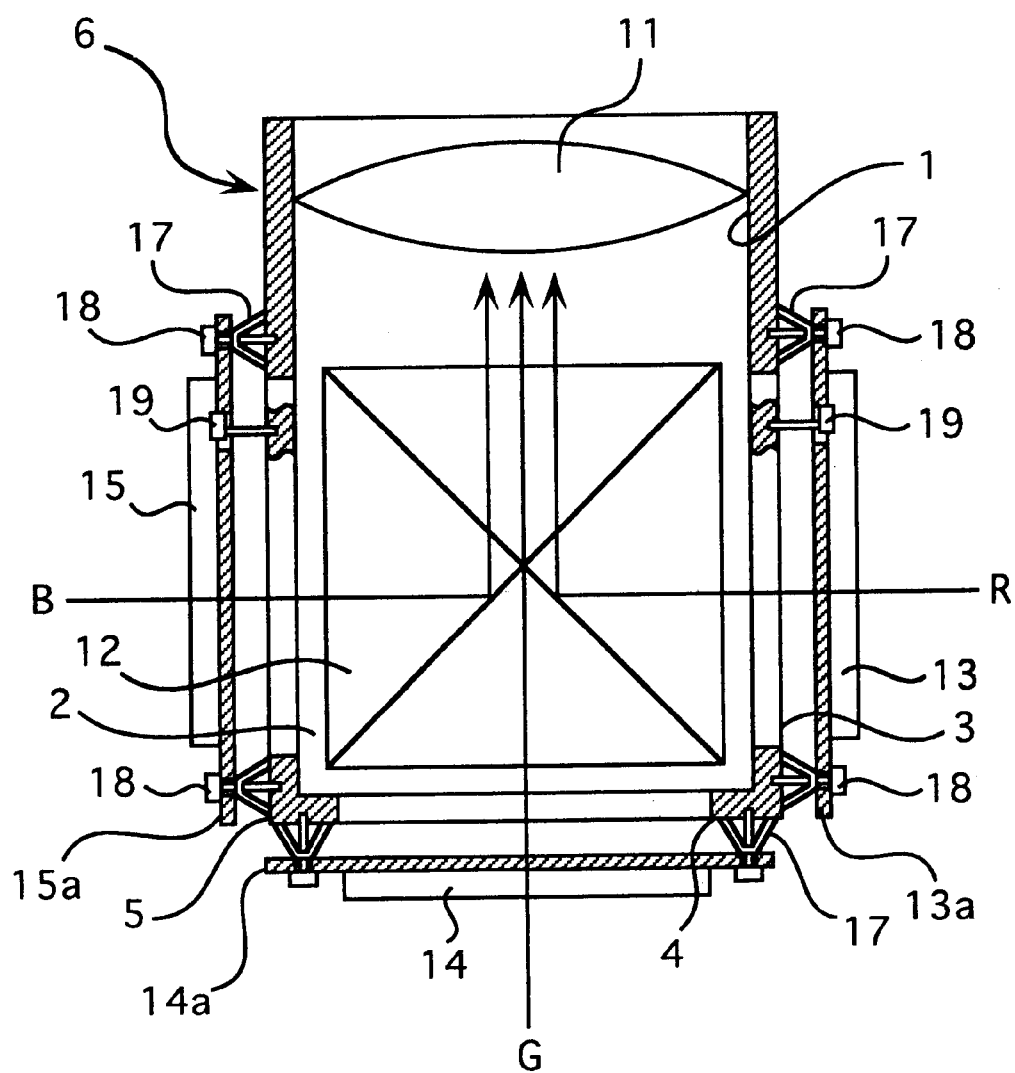
FIG. 1 is a transverse plan view of a projection optical unit according to an embodiment 1 of the present invention.

FIG. 1 is a transverse plan view showing the schematic construction of a projection optical unit in an embodiment 1. The projection optical unit comprises a frame 6. The frame 6 comprises a lens mounting portion 1 on which a projection lens 11 is mounted, a prism mounting portion 2 on which a dichroic prism 12 serving as photosynthesis means for synthesizing red image light, green image light and blue image light is mounted, and three mounting surfaces 3, 4 and 5 on which three liquid crystal display panels for red, green and blue 13, 14 and 15 are respectively mounted. The projection lens 11, the dichroic prism 12, and the three liquid crystal display panels 13, 14 and 15 are mounted on the frame 6.

The lens mounting portion 1 is illustrated in simplified fashion on the drawing, and is actually provided with a mechanism for moving the projection lens 11 along its optical axis, for example.

The liquid crystal display panels 13, 14 and 15 are respectively mounted on supporting plates 13a, 14a and 15a. The supporting plates 13a, 14a and 15a are respectively mounted on the frame 6 through focus adjusting mechanisms. That is, a set of a belleville spring 17 and a screw 18 is provided at each of four corners of each supporting plates. The four sets of belleville springs 17 and screws 18 constitute a focus adjusting mechanism for each of the liquid crystal display panels. The belleville springs 17 are respectively interposed between the mounting surfaces 3, 4 and 5 in the frame 6 and the supporting plates 13a, 14a and 15a. Further, the screws 18 respectively connect the supporting plates 13a, 14a and 15a to the frame 6 and adjust the distances between the supporting plates 13a, 14a and 15a and the mounting surfaces 3, 4 and 5. The distances between the supporting plates and the mounting surfaces are respectively changed by turning the screws 18, so that it is possible to incline each of the liquid crystal display panels and shift the liquid crystal display panel along its optical axis.

The liquid crystal display panel for red 13 and the liquid crystal display panel for blue 15 are further respectively provided with mechanisms for CG adjustment (adjustment for matching pixels of the liquid crystal display panels 13 and 15 with pixels of the liquid crystal display panel for green 14). The mechanisms are respectively constituted by holes formed in the supporting plates 13a and 15a and eccentric screws 19, whose heads inserted into the holes and are brought into contact with peripheral surfaces of the holes, and can respectively move the liquid crystal display panels in its vertical section.

Figure 2:
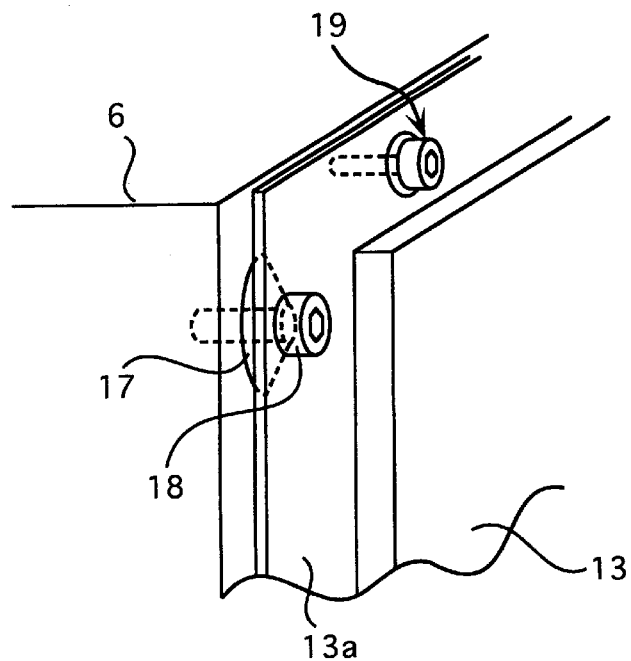
FIG. 2 is a perspective view of a principal part showing a focus adjusting mechanism or the like shown in FIG. 1.

FIG. 2 is a perspective view of a principal part showing the details of the focus adjusting mechanism and the CG adjusting mechanism. Although in the present embodiment, the focus adjusting mechanism is constructed using the belleville spring 17, it goes without saying that a coil spring which expands and contracts in large amounts may be used. The focus adjusting mechanism and the CG adjusting mechanism are not limited to the above-mentioned construction. They may be of another construction.

Figure 3:
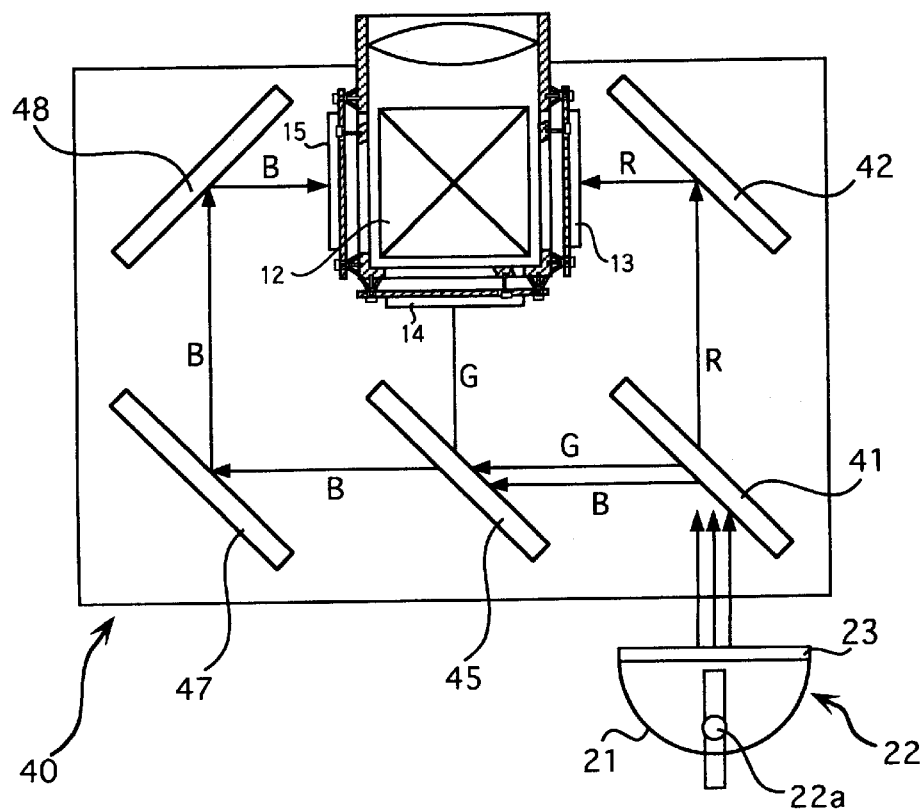
FIG. 3 is a plan view of a projector in which the projection optical unit shown in FIG. 1 is incorporated.

FIG. 3 is a plan view showing a projector 40 in which the above-mentioned projection optical unit is incorporated. Light emitted from a lamp (a halogen lamp or a metal halide lamp) 22a is reflected on a converging reflector 21, is emitted from a light source 22 after ultraviolet rays and infrared rays are removed therefrom through an UV/IR filter 23, and is incident on a dichroic mirror 41. The dichroic mirror 41 transmits red light (R) and reflects green light (G) and blue light (B). The red light obtained by the separation in the dichroic mirror 41 is sent to the liquid crystal display panel for red 13 on which a red image is to be displayed upon being reflected on a total reflection mirror 42. The red light passes through the liquid crystal display panel 13 after the amount of its transmission is changed in the liquid crystal display panel 13, and is then sent to the dichroic prism 12 serving as photosynthesis means.

On the other hand, the green light (g) and the blue light (B) which are reflected on the dichroic mirror 41 are sent to a dichroic mirror 45. The dichroic mirror 45 reflects the green light (G) and transmits the blue light (B). The green light obtained by the separation in the dichroic mirror 45 is sent to the liquid crystal display panel for green 14 on which a green image is to be displayed. The green light passes through the liquid crystal display panel 14 after the amount of its transmission is changed in the liquid crystal display panel 14, and is then sent to the dichroic prism 12.

The blue light passing through the dichroic mirror 45 is sent to the liquid crystal display panel for blue 15 on which a blue image is to be displayed upon being reflected on total reflection mirrors 47 and 48. The blue light passes through the liquid crystal display panel 15 after the amount of its transmission is changed in the liquid crystal display panel 15, and is then sent to the dichroic prism 12.

The red light, the green light and the blue light which are incident on the dichroic prism 12 are synthesized, and light obtained by the synthesis is emitted as color image light (R, G, B). The emitted color image light is projected on a screen (not shown) through the projection lens 11.

In the above-mentioned construction, the frame 6 is smaller than a case of the projector 40, so that it is hardly distorted, for example, by its own weight, and is easily formed, for example. Therefore, precision is easily given to the mounting portions 1 and 2 and the mounting surfaces 3, 4 and 5. Thus, as high precision has been already given in the frame 6, only by mounting the projection lens and the liquid crystal display panels 13, 14 and 15 on the frame 6, therefore, the necessity of adjusting their optical axes may be eliminated.

In the present embodiment, the liquid crystal display panels 13, 14 and 15 shall be respectively mounted on the mounting surfaces 3, 4 and 5 through focusing mechanisms, considering that enough precision to eliminate the necessity for adjustment is not necessarily easy to ensure. Since high precision has been already given in the mounting surfaces 3, 4 and 5 in a case where adjustment is made in the focusing mechanisms, so that the adjustment can be made in a short time period, and the fine adjustment is easy.

Furthermore, it has been conventionally necessary to make various kinds of adjustment upon incorporating the projection lens and the liquid crystal display panel into the case of the projector. In the above-mentioned construction, however, the adjustment can be made in a stage of the projection optical unit, so that the projection optical unit can be incorporated into the projector 40 after completing the adjustment, and the assembly work of the projector 40 is also made efficient.

Although in the above-mentioned embodiment, the projection optical unit used for a projector of a three-panel type is illustrated, the projector can be of a single panel type. That is, there may be provided a frame having a lens mounting portion on which a projection lens is mounted, and a mounting surface on which one liquid crystal display panel is mounted, formed therein, and the projection lens and the one liquid crystal display panel may be provided in the frame. In this case, no dichroic prism 12 is required.

(Embodiment 2)

Figure 4:
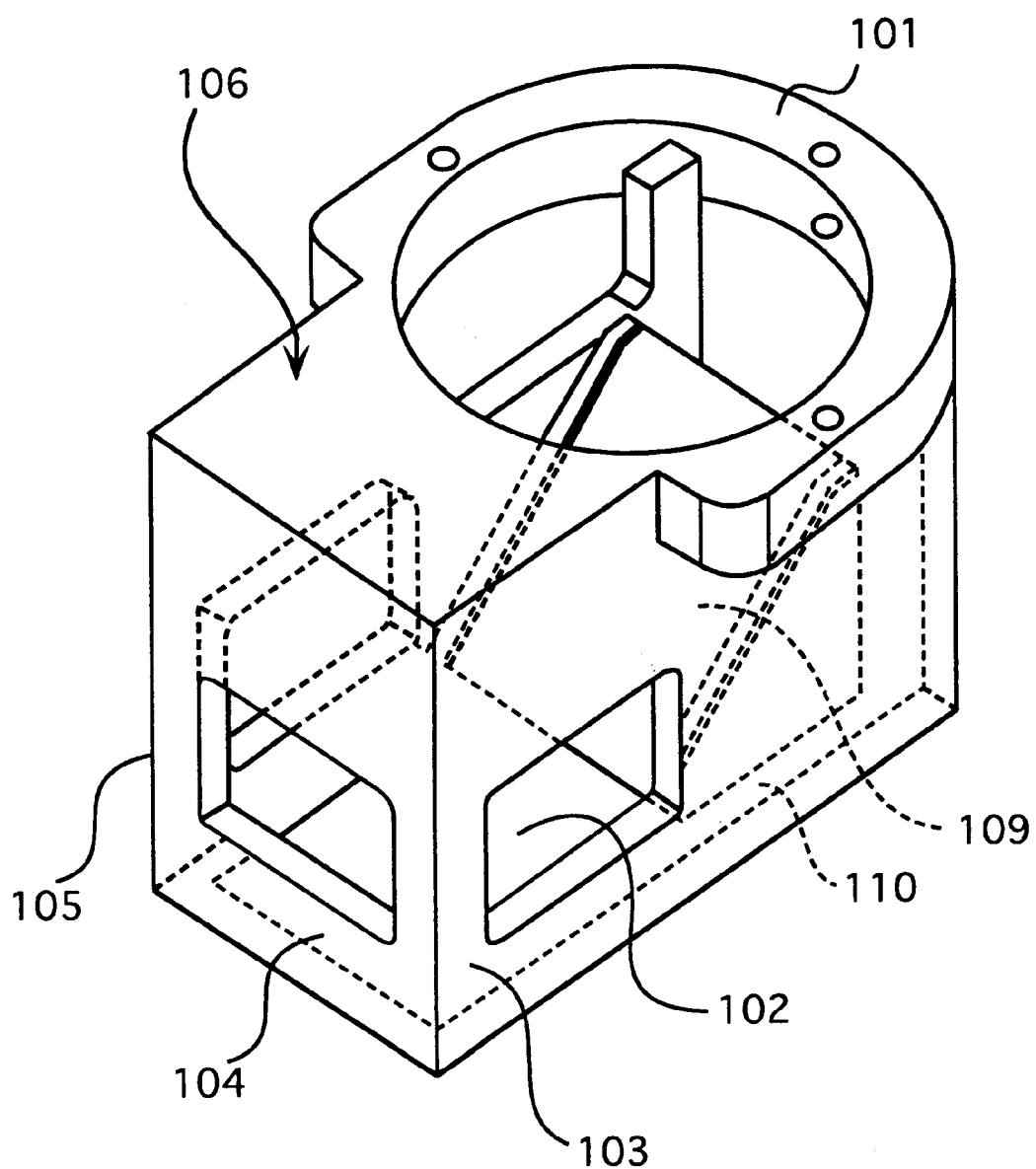
FIG. 4 is a perspective view showing a frame in a projection optical unit according to an embodiment 2 of the present invention.
Figure 5:
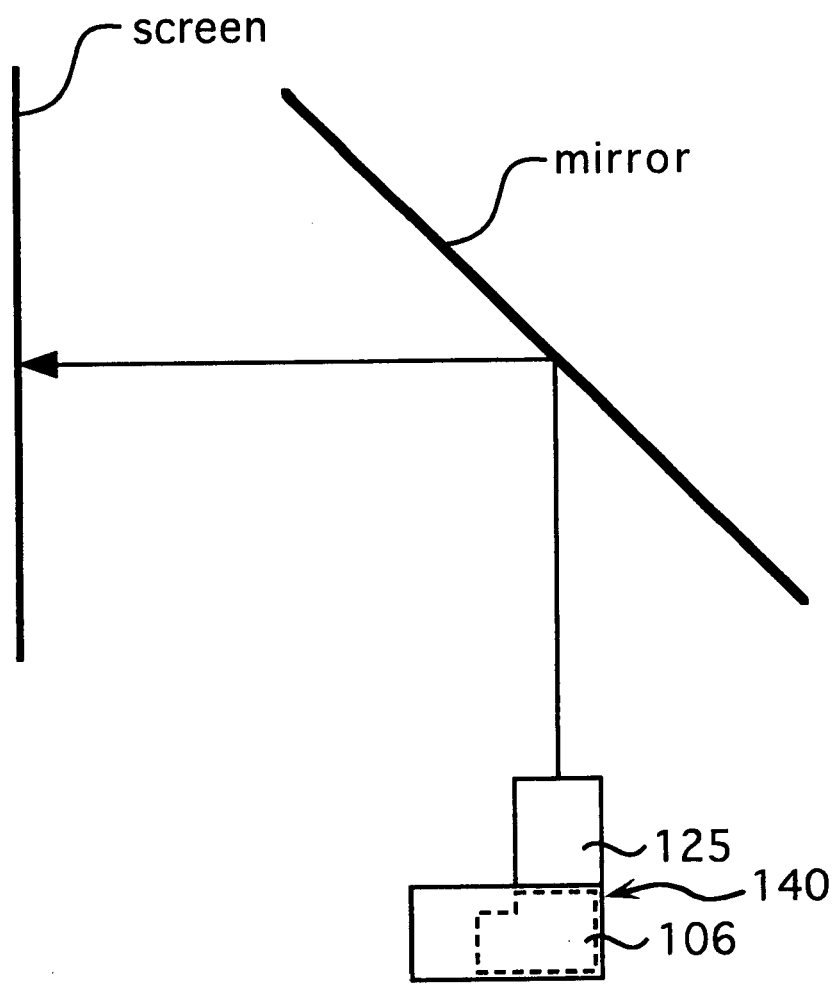
FIG. 5 is an explanatory view schematically showing a projection display using a projection optical unit composed of the frame shown in FIG. 4.

FIG. 4 is a perspective view showing a frame 106 used for a projection optical unit in an embodiment 2, and FIG. 5 is an explanatory view showing the construction of a projector 140 and a projection display in a case where the frame 106 is used. In the frame 106, a lens mounting portion 101 on which a projection lens unit 125 (see FIG. 5) is mounted, a mirror mounting portion 110 on which a mirror 109 which is a reflecting optical member for changing an optical path is mounted, a prism mounting portion 102 on which a dichroic prism (not shown) which is photosynthesis means for synthesizing red image light, green image light and blue image light, and three mounting surfaces 103, 104 and 105 on which three liquid crystal display panels for red, green and blue (not shown) are mounted are formed in the frame 106.

The frame 106 is provided with the projection lens unit 125, the dichroic prism, and the three liquid crystal display panels. The projection optical unit 125 is provided with a mechanism for moving the projection lens along its optical axis, for example.

The three liquid crystal display panels are respectively mounted on the frame 106 through focus adjusting mechanisms having the same structure as that in the embodiment 1. The liquid crystal display panel for red and the liquid crystal display panel for blue are further respectively provided with CG adjusting mechanisms. The projection optical unit is incorporated into the projector 140, as in the embodiment 1.

In the above-mentioned construction, it goes without saying that the same function as that in the embodiment 1 is performed, but a projection display in which the projector 140 is placed flat can be realized, as shown in FIG. 5, because there is provided a mirror 109 for changing an optical path, so that the height of the projection display can be decreased. The mirror 109 may be replaced with a rectangular prism. In a case where the rectangular prism is used, a substantially long distance of the optical path can be ensured. If high precision has been already given in the frame 106, the necessity of the focus adjustment or the like can be eliminated only by mounting the above-mentioned liquid crystal display panel on the frame 106.

Figure 6A:
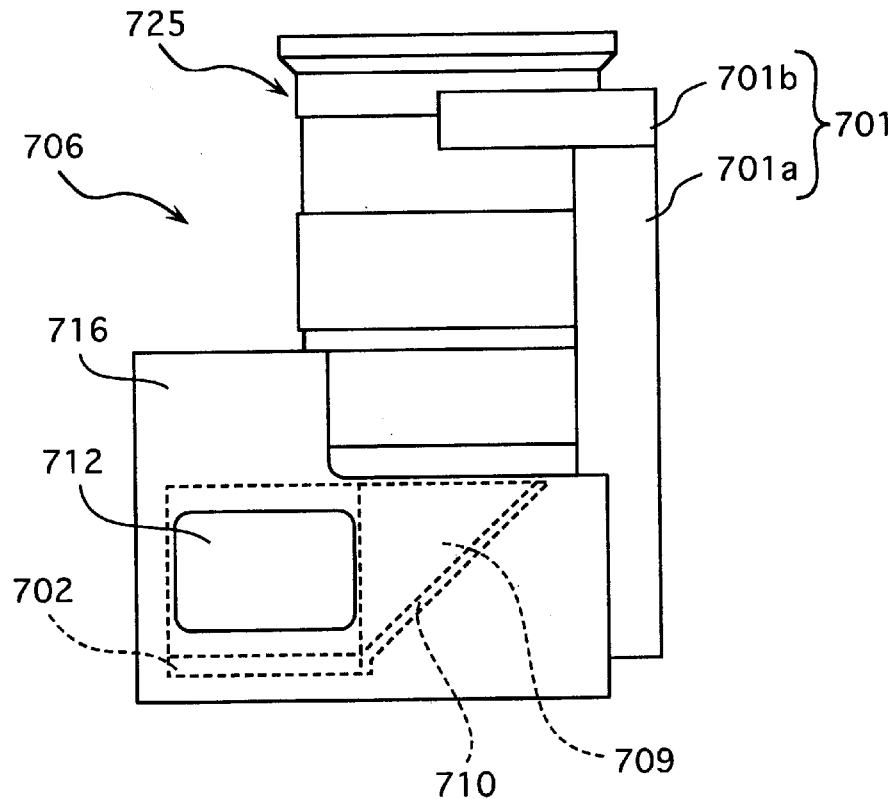
FIG. 6A is a side view showing a modified example of a frame.
Figure 6B:
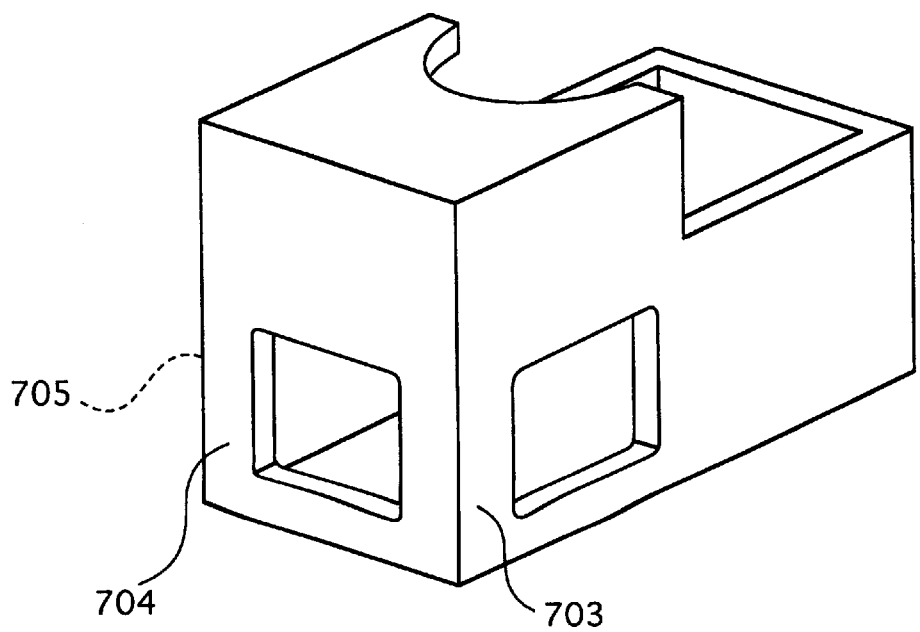
FIG. 6B is a perspective view showing a prism box constituting the frame.

The frame 106 shown in FIG. 4 may be replaced with a frame 706 shown in FIGS. 6A and 6B. The frame 706 is constituted by a prism box 716 and a projection lens mounting member 701. In the prism box 716, a rectangular prism mounting portion 710 in which a rectangular prism 709 is mounted, a prism mounting portion 702 on which a dichroic prism 712 is mounted, and three mounting surfaces 703, 704 and 705 on which three liquid crystal display panels for red, green and blue (not shown) are mounted are formed. The liquid crystal display panels may be respectively mounted on the mounting surfaces 703, 704 and 705 through focus adjusting mechanisms, or may be directly mounted on the mounting surfaces 703, 704 and 705 without through the focus adjusting mechanisms.

The projection lens mounting member 701 comprises a support 701a mounted on a sidewall of the prism box 716 by a screw or the like and a supporting member 701b in the shape of a C ring which is mounted on an upper end of the support 701a. The supporting member 701b is mounted on the support 701a so as to be slightly movable (adjustable) in the horizontal direction. The inner periphery of the supporting member 701b and the surface of the body of a projection lens unit 725 are threaded. The projection lens unit 725 is held by screwing the projection lens unit 725 into the supporting member 701b, and the movement thereof along its optical axis can be adjusted by adjusting the amount of screwing.

(Embodiment 3)

Figure 7:
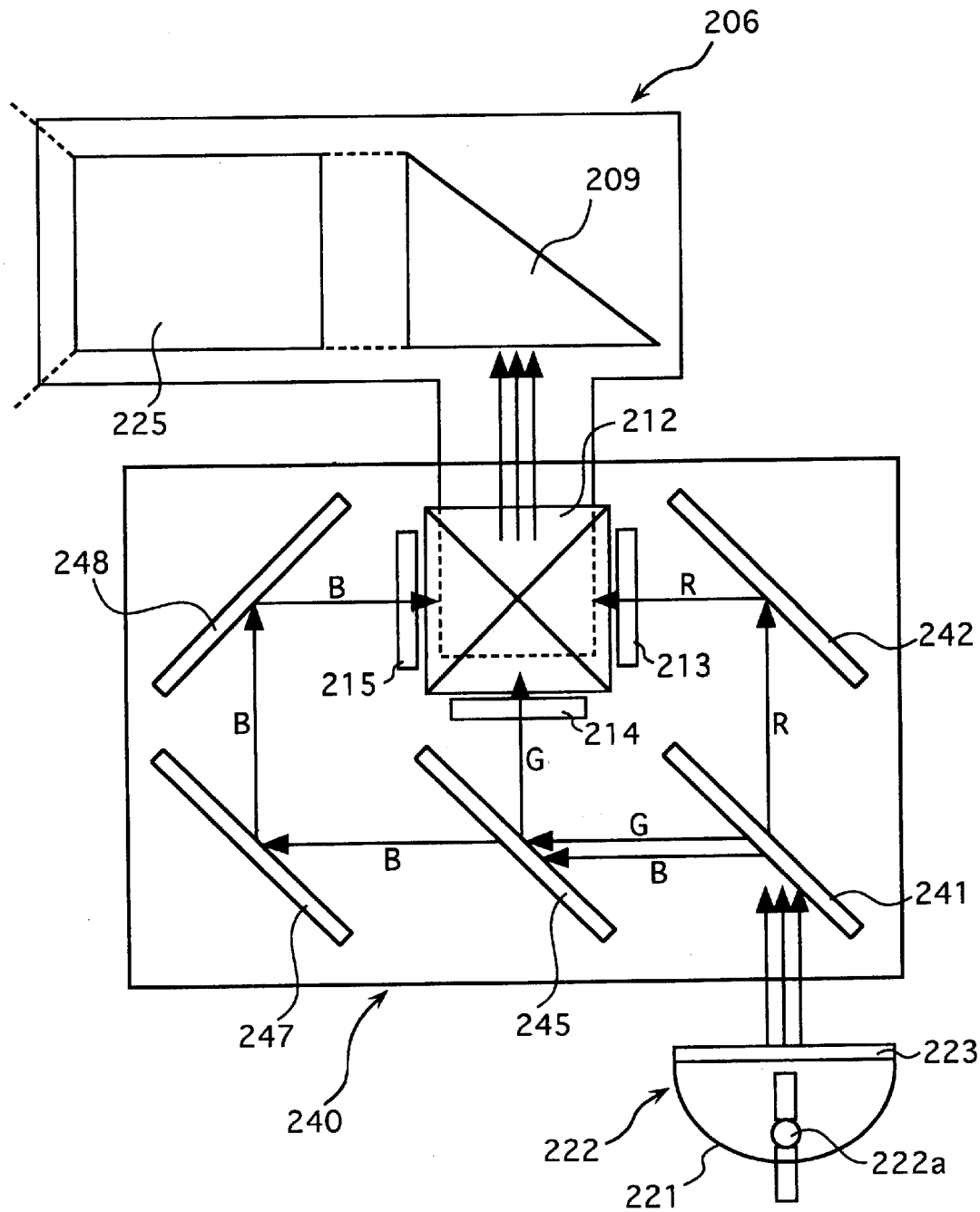
FIG. 7 is a plan view of a projector used in a projection display according to an embodiment 3 of the present invention.

A third embodiment of the present invention will be described on the basis of FIG. 7. FIG. 7 is a plan view showing the construction of a projector 240 using a connecting member 206. Although in FIG. 7, the projection lens 225 is actually arranged above a rectangular prism 209, it is drawn on a level therewith for convenience of illustration.

A lens mounting portion on which a projection lens unit 225 is mounted, a rectangular prism mounting potion on which the rectangular prism 209 which is a reflecting optical member for changing an optical path is mounted, and a prism mounting portion on which a dichroic prism 212 which is photosynthesis means for synthesizing red image light, green image light and blue image light are formed in the connecting member 206. The connecting member 206 is provided with the projection lens unit 225, the rectangular prism 209, and the dichroic prism 212.

Light emitted from a lamp 222a is reflected on a converging reflector 221, is emitted from a light source 222 after ultraviolet rays and infrared rays are removed therefrom through a UV/IR filter 223, and is incident on a dichroic mirror 241. The dichroic mirror 241 transmits red light (R) and reflects green light (G) and blue light (B). The red light obtained by the separation in the dichroic mirror 241 is sent to a liquid crystal display panel for red 213 on which a red image is to be displayed upon being reflected on a total reflection mirror 242. The red light passes through the liquid crystal display panel 213 after the amount of its transmission is changed by the liquid crystal display panel 213, and is then sent to the dichroic prism 212.

On the other hand, green light (G) and blue light (B) which are reflected on the dichroic mirror 241 are sent to a dichroic mirror 245. The dichroic mirror 245 reflects the green light (G) and transmits the blue light (B). The green light obtained by the separation in the dichroic mirror 245 is sent to a liquid crystal display panel for green 214 on which a green image is to be displayed. The green light passes through the liquid crystal display panel 214 after the amount of its transmission is changed in the liquid crystal display panel 214, and is then sent to the dichroic prism 212.

The blue light passing through the dichroic mirror 245 is sent to a liquid crystal display panel for blue 215 on which a blue image is to be displayed upon being reflected by total reflection mirrors 247 and 248. The blue light passes through the liquid crystal display panel 215 after the amount of its transmission is changed in the liquid crystal display panel 215, and is then sent to the dichroic prism 212.

The red light, the green light and the blue light which are incident on the dichroic prism 212 are synthesized, and light obtained by the synthesis is emitted as color image light (R, G, B). The color image light emitted from the dichroic prism 212 is reflected after its optical path is changed by approximately 90° upward by the rectangular prism 209 and then is introduced to the projection lens 225. The color image light passing through the projection lens 225 is enlarged and projected on a screen (not shown).

It is possible to miniaturize a projection display by thus using the projector 240 using three liquid crystal display panels and effectively utilizing a transverse space which is regulated by the width of the screen to decrease the height and the depth of the projector 240. Since the rectangular prism 209, the projection lens 225 and the dichroic prism 212 are integrally provided by the connecting member 206, work for mounting the rectangular prism 209, the projection lens 225 and the dichroic prism 212 becomes easy, and the optical axes of the optical members can be adjusted with high precision.

(Embodiment 4)

Figure 8:
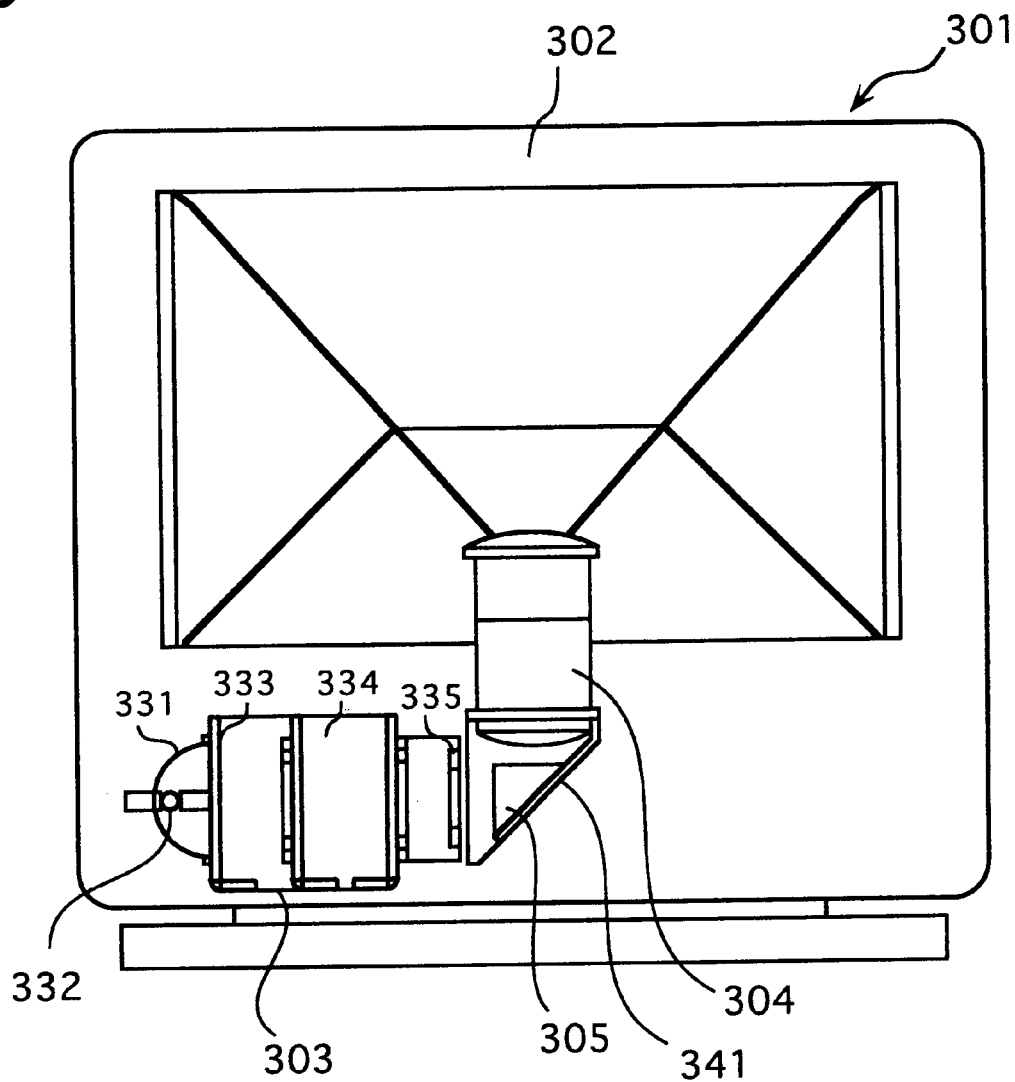
FIG. 8 is a rear elevation of a projection display according to an embodiment 4.
Figure 9:
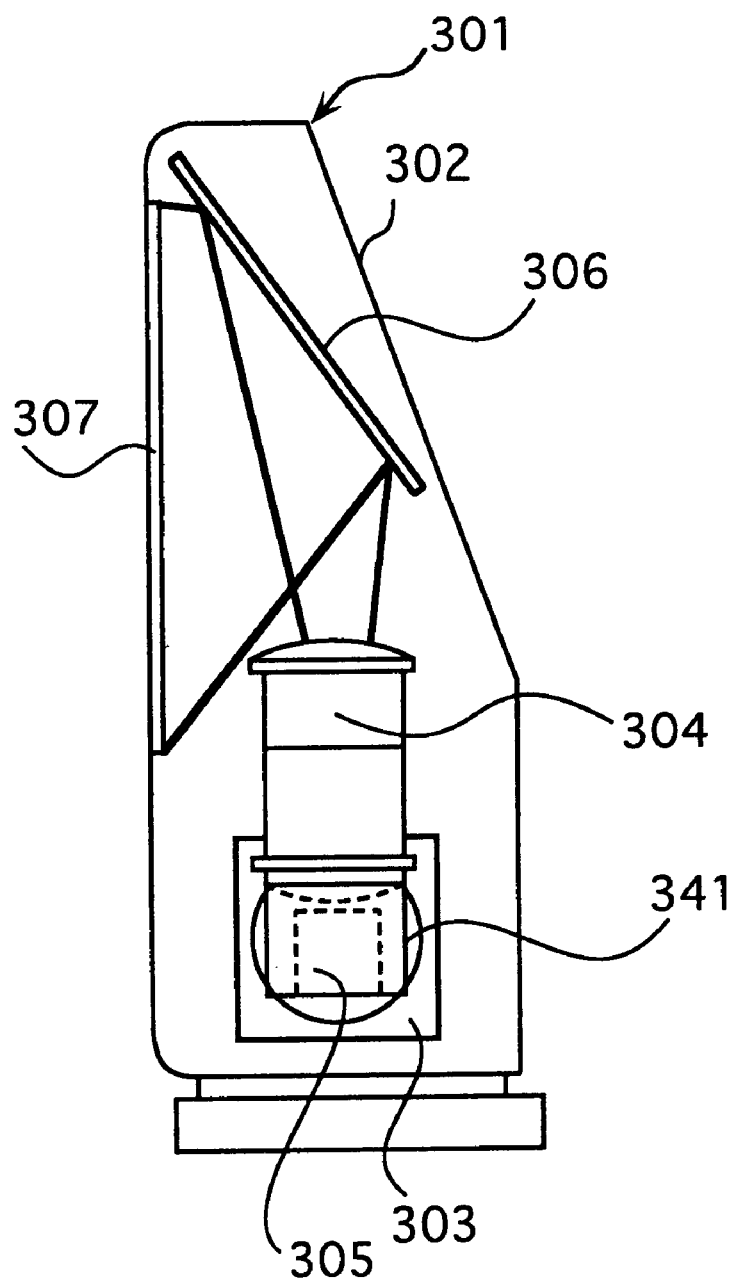
FIG. 9 is a side view of the projection display shown in FIG. 8.

A fourth embodiment of the present invention will be described on the basis of FIGS. 8 to 10. FIG. 8 is a rear elevation showing the schematic construction of a projection display according to the present embodiment, FIG. 9 is a side view of FIG. 8, and FIG. 10 is a diagram showing the construction of a projector using a liquid crystal display panel.

A projection display 301 in the present embodiment comprises a projector 303, a projection lens 304, a rectangular prism 305 which is a reflecting optical member, a reflecting mirror 306, a case 302 containing the optical members, and a transmission type diffusing screen 307.

Figure 10:
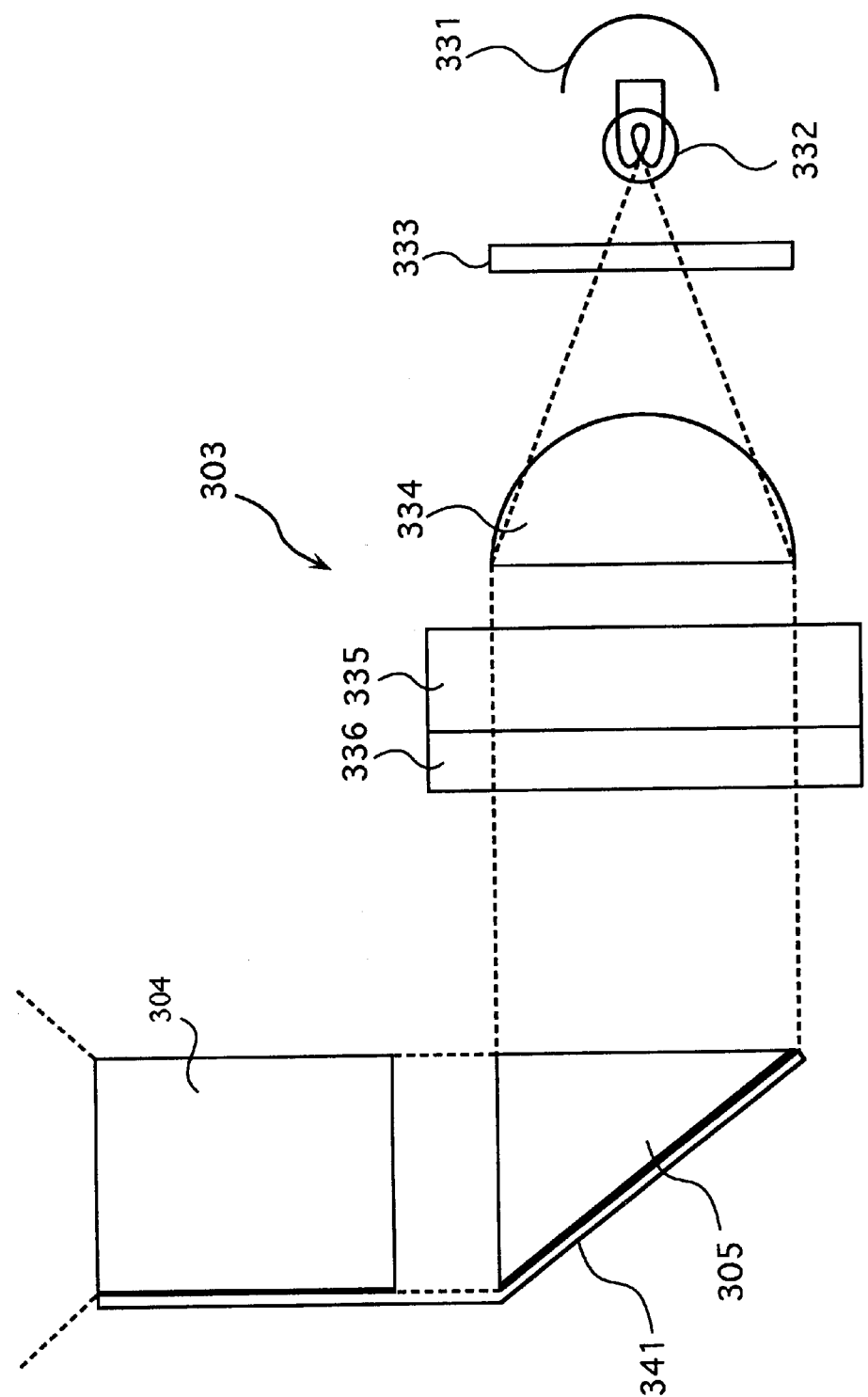
FIG. 10 is an explanatory view showing the schematic construction of a projector in the projection display shown in FIG. 8.

The projector 303 as shown in FIG. 10 is constructed by disposing a reflector 331, a metal halide lamp 332, a UV/IR filter 333, a condenser lens 334, a liquid crystal display panel 335, and a color filter 336 in this order. White light irradiated from the metal halide lamp 332 is converged by the condenser lens 334 upon passing through the UV/IR filter 333, and is then incident on the liquid crystal display panel 335. The liquid crystal display panel 335 is constructed by providing an incidence side polarizing plate and an emission side polarizing plate with a liquid crystal layer interposed therebetween. When the light incident on the liquid crystal display panel 335 becomes image light upon passing through the polarizing plates, the light becomes image light composed of polarized light in a predetermined direction of vibration.

The color filter 336 has a red filter portion, a green filter portion, and a blue filter portion respectively corresponding to pixels for red (R), pixels for green (G), and pixels for blue (B) which are formed in a matrix shape on the liquid crystal display panel 335, and converts white image light passing through the liquid crystal display panel 335 into color image light.

The color image light is emitted in a direction parallel to the length of the screen 307 from the color filter 336. The emitted color image light is reflected in a direction at right angles to an optical axis of the color image light and parallel to the screen 307 by the rectangular prism 305 which is a reflecting optical member for refracting an optical path, and is sent to the projection lens 304. The projection lens 304 enlarges and projects the color image light obtained in the color filter 336. The rectangular prism 305 is used as the reflecting optical member, so that the distance of the optical path can be made longer, as compared with a case where a reflecting mirror or the like is used as the reflecting optical member.

In the projection display 301 in the present embodiment, the projector 303 is arranged laterally to the screen as viewed from a front (or a rear) of the screen 307 such that the optical axis of the color image light emitted from the projector 303 (the optical axis of the image light traveling toward the rectangular prism 305) is parallel to the length of the screen 307 (see FIG. 8).

The rectangular prism 305 and the projection lens 304 are provided so as to introduce the color image light in a direction at right angles to the optical axis of the color image light emitted from the projector 303 (the optical axis of the image light traveling toward the rectangular prism 305) and parallel to the screen 307. That is, the color image light from the projector 303 is sent to the projection lens 304 after the direction of travel thereof is changed upward by 90° by the rectangular prism 305.

The color image light enlarged by the projection lens 304 is reflected by the total reflection mirror 306, and the projected color image light is incident on the rear surface of the transmission type diffusing screen 307, and is diffused and emitted from the front surface of the screen 307, so that a viewer can view a color image in a position on the front of the screen 307.

The larger the width (the size in the transverse direction in FIG. 8) and the height (the size in the longitudinal direction in FIG. 8) of the screen 307 are, the larger the case 302 of the projection display 301 is. That is, the width of the case 302 is limited by the width of the screen 307, and the height of the case 302 is determined by the height of the screen 307 in consideration of dimensions in optical arrangement of the projector 303, the projection lens 304, and so forth which are positioned below the screen 307. If the projector 303 is placed flat such that the direction of the optical axis of the image light traveling toward the rectangular prism 305 is along the depth of the case 302, the depth of the case 302 cannot be decreased, although the height of the case 302 is decreased.

Since in the present embodiment, the projector 303 is arranged laterally to the case 302, that is, the projector 303 is arranged such that the optical axis of the image light traveling toward the rectangular prism 305 is parallel to the length of the screen 307, so that the depth of the case 302 can be also decreased.

Since the rectangular prism 305 and the projection lens 304 are integrally provided by a connecting member 341, work for mounting the projection lens 304 and the rectangular prism 305 becomes easy, and both their optical axes can be adjusted with high precision. Although in the present embodiment, the connecting member 341 is constructed separately from a lens supporting cylinder of the projection lens 304, a structure in which the lens supporting cylinder is also used as the connecting member 341, that is, a structure in which a mounting portion of the rectangular prism 305 is formed in the lens supporting cylinder may be employed.

The rectangular prism 305, the projection lens 304 and the liquid crystal display panel 335 may be integrated by replacing the connecting member 341 with the frame 106 illustrated in the embodiment 2 or deforming the frame 106 into one for a single panel.

(Embodiment 5)

Figure 11:
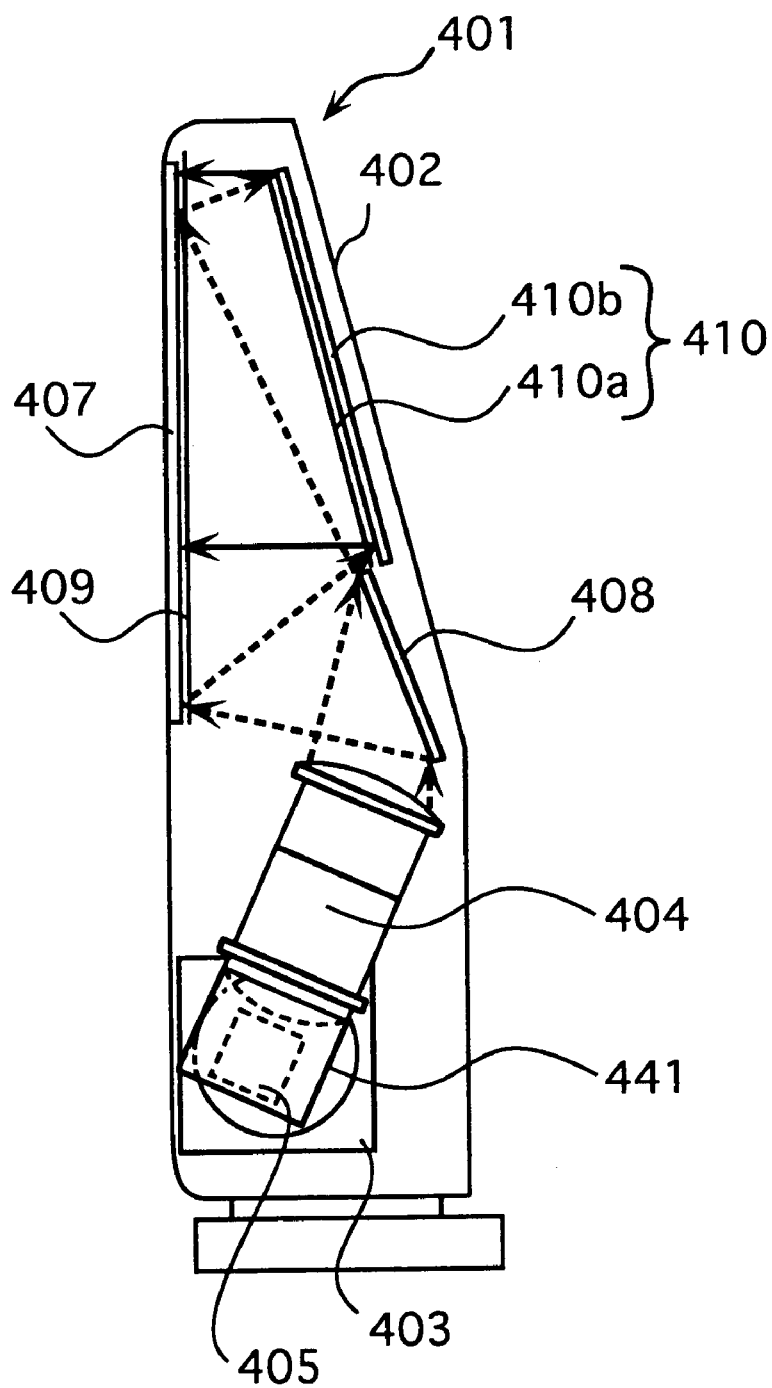
FIG. 11 is a side view of a projection display according to an embodiment 5.
Figure 12:
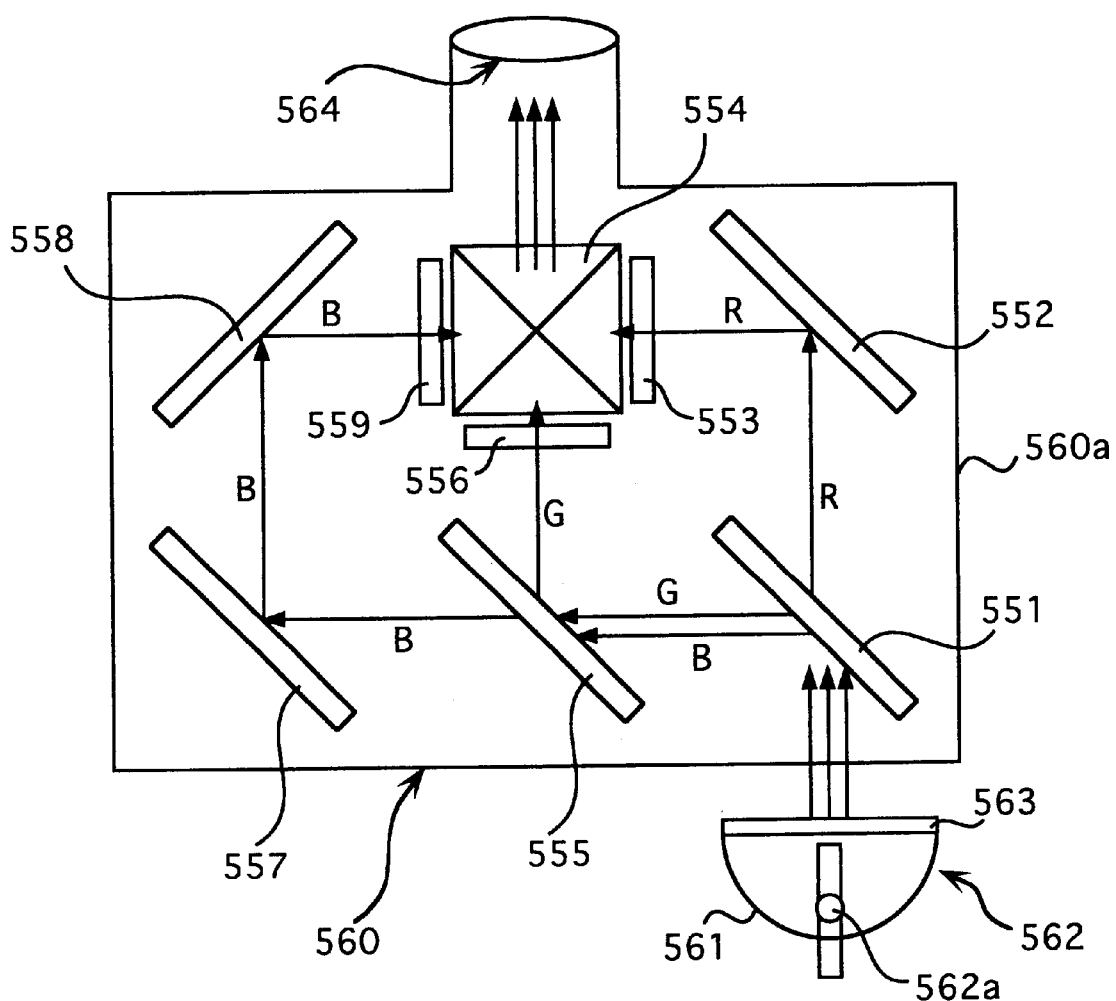
FIG. 12 is a plan view showing an example of a conventional projector.
Figure 13:
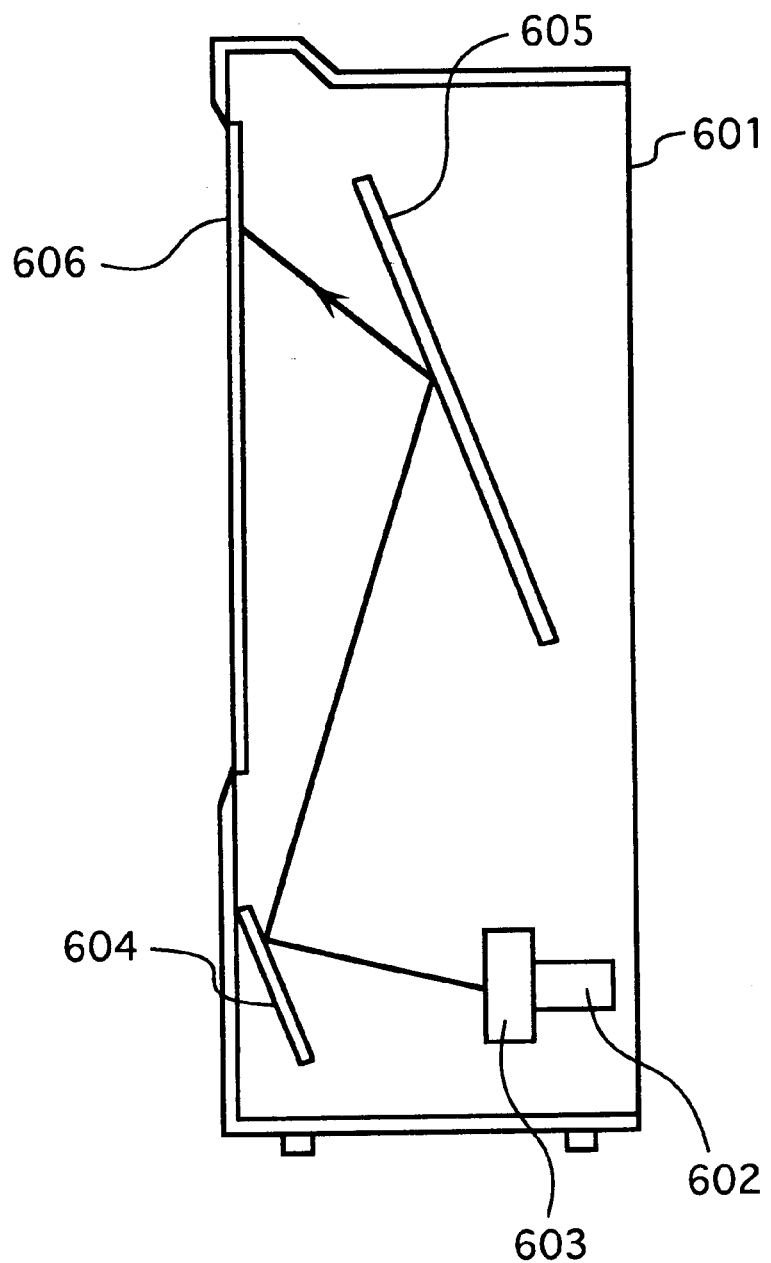
FIG. 13 is a side view showing an example of a conventional projection display.

An embodiment 5 of the present invention will be described on the basis of FIG. 11. FIG. 11 is a side view showing the schematic construction of a projection display in the present embodiment. The projection display in the present embodiment uses a liquid crystal display panel of a single panel type as a projector 403, as in the embodiment 4, so that a projection lens 404 and a rectangular prism 405 are integrated by a connecting member 441.

The projector 403 is arranged laterally as viewed from a front surface (or a rear surface) of a screen 407 such that an optical axis of color image light emitted from the projector 403 (an optical axis of image light traveling toward the rectangular prism 405) is parallel to the length of the screen 407. The rectangular prism 405 and the projection lens 404 are disposed so as to introduce the color image light in a direction perpendicular to the optical axis of the color image light emitted from the projector 403 (the optical axis of the image light traveling toward the rectangular prism 405) and approximately parallel to the screen 407 (a direction slightly away from the screen 407). That is, the color image light from the projector 403 is sent to the projection lens 404 after the direction of travel thereof is changed obliquely upward by 90° by the rectangular prism 405.

The liquid crystal display panel provided in the projector 403 comprises an incidence side polarizing plate and an emission side polarizing plate with a liquid crystal layer interposed therebetween. In the present embodiment, S polarized color image light is emitted. The S polarized color image light passing through the projection lens 404 upon being emitted from the projector 403 is sent to a first reflecting mirror 408. The S polarized color image light is reflected by the first reflecting mirror 408, and is sent to light separation means (second optical means) 409 arranged on the rear surface of the screen 407.

The light separation means 409 has the property of transmitting only P polarized light and reflecting the other polarized light. In the present embodiment, the light separation means 409 is constituted by a plane polarizing mirror. The S polarized color image light from the first reflecting mirror 408 is reflected by the light separation means 409. The reflected S polarized color image light is led to second reflection means (first optical means) 410.

The second reflection means 410 is constituted by a ¼λ plate 410a and a total reflection mirror 410b, and is arranged such that the image light from the light separation means 409 is reflected toward the screen 407. The ¼λ plate 410a has the function of rotating the direction of vibration of light passing therethrough by 45°. When the S polarized image light from the light separation means 409 passes through the ¼λ plate 410a, the first rotation in the direction of vibration (rotation through an angle of 45°) is made. When the S polarized image light passes through the ¼λ plate 410a again upon being reflected on the total reflection mirror 410b, the second rotation in the direction of vibration (rotation through an angle of 45°) is made. Consequently, the direction of vibration of the S polarized color image light is rotated by a total of 90°, and is introduced into the screen 407 as P polarized color image light (see a solid line in FIG. 11).

Since the light separation means 409 arranged on the rear surface of the screen 407 transmits the P polarized light, as described above, the P polarized color image light introduced into the screen 407 passes through the light separation means 409. Consequently, a color image is displayed on the screen 407.

In the above-mentioned construction utilizing the polarized light composing the image light, an optical path of the image light to the screen 407 can be made long while narrowing space between the screen 407 and the second reflection means 410 to decrease the depth of the projection display. The height of the projection display is slightly larger, while the depth thereof is further smaller, as compared with the projection display in the fourth embodiment.

Although in the present embodiment, the projection lens 404 and the rectangular prism 405 are integrated by the connecting member 441, the rectangular prism 405, the projection lens 404 and the liquid crystal display panel may be integrated using the frame 106 illustrated in the embodiment 2 or deforming the frame 106 into one for a single panel.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection optical unit comprising:

an adjustable frame adjustable to adjust an image quality having a lens mounting portion on which a projection lens is mounted and a mounting surface on which a liquid crystal display panel is mounted;

said projection lens and said liquid crystal display panel being provided with the frame.

2. The projection optical unit according to claim 1, wherein said liquid crystal display panel is mounted on said mounting surface through an adjuster screw.

3. The projection optical unit according to claim 2, wherein said adjuster screw is for focus adjustment.

4. The projection optical unit according to claim 1, wherein said frame further comprises a reflecting optical member mounting portion on which a reflecting optical member for introducing image light from said liquid crystal display panel into said projection lens upon changing an optical path of the image light is mounted, said reflecting optical member being provided with the reflecting optical member mounting portion.

5. The projection optical unit according to claim 4, wherein
said liquid crystal display panel is mounted on said mounting surface through an adjuster screw.

6. The projection optical unit according to claim 5, wherein
said adjuster screw is for focus adjustment.

7. A projection optical unit comprising:
an adjustable frame adjustable to adjust an image quality having a lens mounting portion on which a projection lens is mounted, and a photosynthesis means mounting portion on which photosynthesis means for synthesizing red image light, green image light and blue image light is mounted, and three mounting surfaces on which three liquid crystal display panels for red, green and blue are respectively mounted;
said projection lens, said photosynthesis means, and the three liquid crystal display panels being provided with the frame.

8. The projection optical unit according to claim 7, wherein
said liquid crystal display panel is mounted on said mounting surface through an adjuster screw.

9. The projection optical unit according to claim 8, wherein
said adjuster screw is for focus adjustment.

10. The projection optical unit according to claim 7, wherein
said frame further comprises a reflecting optical member mounting portion on which a reflecting optical member for introducing image light from said photosynthesis means into said projection lens upon changing an optical path of the image light is mounted,
said reflecting optical member being provided with the reflecting optical member mounting portion.

11. The projection optical unit according to claim 10, wherein
said liquid crystal display panel is mounted on said mounting surface through an adjuster screw.

12. The projection optical unit according to claim 11, wherein
said adjuster screw is for focus adjustment.

13. A projection display for enlarging image light from a projector using a projection lens and projecting and displaying the image light on a screen, comprising:
an adjustable frame adjustable to adjust an image quality having a lens mounting portion on which the projection lens is mounted, a mounting surface on which a liquid crystal display panel is mounted, and a reflecting optical member mounting portion on which a reflecting optical member for introducing image light from said liquid crystal display panel into said projection lens upon changing an optical path of the image light is mounted,
said projection lens, the liquid crystal display panel and the reflecting optical member being provided with the frame.

14. The projection display according to claim 13, wherein
the projector is arranged such that an optical axis of image light traveling toward said reflecting optical member is parallel or approximately parallel to a surface of said screen, and
said reflecting optical member and the projection lens are disposed so as to introduce the image light in a direction perpendicular or approximately perpendicular to the optical axis of the image light traveling toward said reflecting optical member, wherein
all image light projected onto said screen consists essentially of said image light traveling toward said reflecting optical member.

15. The projection display according to claim 13, further comprising
first optical means for reflecting the image light toward the rear surface of said screen, and
second optical means provided on the rear surface of said screen for reflecting the image light toward said first optical means,
the image light reflected at least once by said second optical means to be led to said first optical means and reflected by the first optical means being led to said screen upon passing through said second optical means.

16. A projection display for enlarging image light from a projector using a projection lens and projecting and displaying the image light on a screen, comprising:
an adjustable frame adjustable to adjust an image quality having a lens mounting portion on which a projection lens is mounted, a photosynthesis means mounting portion on which photosynthesis means for synthesizing red image light, green image light and blue image light is mounted, three mounting surfaces on which three liquid crystal display panels for red, green and blue are respectively mounted, and a reflecting optical member mounting portion on which a reflecting optical member for introducing the image light from said photosynthesis means into said projection lens upon changing an optical path of the image light is mounted;
said projection lens, the reflecting optical member, the photosynthesis means, and the three liquid crystal display panels being provided with the frame.

17. The projection display according to claim 16, wherein
the projector is arranged such that an optical axis of image light traveling toward said reflecting optical member is parallel or approximately parallel to a surface of said screen, and
said reflecting optical member and the projection lens are disposed so as to introduce the image light in a direction perpendicular or approximately perpendicular to the optical axis of the image light traveling toward said reflecting optical member, wherein
all image light projected onto said screen consists essentially of said image light traveling toward said reflecting optical member.

18. The projection display according to claim 16, further comprising
first optical means for reflecting the image light toward the rear surface of said screen, and
second optical means provided on the rear surface of said screen for reflecting the image light toward said first optical means,
the image light reflected at least once by said second optical means to be led to said first optical means and reflected by the first optical means being led to said screen upon passing through said second optical means.

19. The projection display according to claim 14, wherein said image light travelling toward said reflecting optical members includes red, blue, and green light.

20. The projection display according to claim 17, wherein said all image light travelling toward said reflecting optical members includes red, blue, and green light.

21. The projection optical unit according to claim 1, wherein the adjustable frame is adjustable to perform a focus adjustment.

22. The projection optical unit according to claim 7, wherein the adjustable frame is adjustable to perform a focus adjustment.

23. The projection display according to claim 13, wherein the adjustable frame is adjustable to perform a focus adjustment.

24. The projection display according to claim 16, wherein the adjustable frame is adjustable to perform a focus adjustment.

25. The projection optical unit according to claim 7, wherein the adjustable frame is adjustable to perform a CG adjustment.

26. The projection display according to claim 16, wherein the adjustable frame is adjustable to perform a CG adjustment.

27. The projection optical unit according to claim 1, wherein the liquid crystal display panel is mounted on the outside of the adjustable frame.

28. The projection optical unit according to claim 7, wherein the liquid crystal display panels are mounted on the outside of the adjustable frame.

29. The projection display according to claim 13, wherein the liquid crystal display panel is mounted on the outside of the adjustable frame.

30. The projection display according to claim 16, wherein the liquid crystal display panels are mounted on the outside of the adjustable frame.

31. A method for assembling a projection display, comprising:

(a) mounting at least one projection lens and at least one liquid crystal display panel on a frame, (b) performing at least one of a focus adjustment the at least one projection lens and a CG adjustment of the at least one crystal display panel, (c) after step (b), incorporating the frame, the at least one projection lens and the at least one liquid crystal display panel into a case of the projection display.

* * * * *